United States Patent [19]
Blasko et al.

[11] Patent Number: 5,610,806
[45] Date of Patent: Mar. 11, 1997

[54] PULSE WIDTH MODULATION METHOD FOR DRIVING THREE PHASE POWER INVERTER/CONVERTER SWITCHES WITH BALANCED DISCONTINUOUS PHASE COMMANDS

[75] Inventors: Vladimir Blasko, Grafton; Vikram Kaura, Cedarburg, both of Wis.

[73] Assignee: Allen-Bradley Company, Inc., Milwaukee, Wis.

[21] Appl. No.: 491,745

[22] Filed: Jun. 19, 1995

[51] Int. Cl.[6] .................................................. H02M 1/12
[52] U.S. Cl. .................................................. 363/41; 363/98
[58] Field of Search ................................. 363/41, 98

[56] References Cited

U.S. PATENT DOCUMENTS

| | | | |
|---|---|---|---|
| 4,920,472 | 4/1990 | Handler | 363/41 |
| 5,091,841 | 2/1992 | Tuusa | 363/41 |
| 5,153,821 | 10/1992 | Blasko | 363/41 |
| 5,329,217 | 7/1994 | Kerkman et al. | 363/41 |

*Primary Examiner*—Stuart N. Hecker
*Attorney, Agent, or Firm*—Michael A. Jaskolski; John M. Miller; John J. Horn

[57] ABSTRACT

A method and/or apparatus for converting voltage using a pulse width modulator and an inverter/converter, the inverter/converter including three legs and a triangle signal generator providing a triangle signal having a peak magnitude. A plurality of sinusoidal reference signals are provided which are displaced from one another by a phase angle. The absolute values of the maximum and minimum values of the reference signals are detected, if the absolute value of the maximum signal is greater than or equal to the absolute value of the minimum signal, the maximum signal is subtracted from the peak magnitude to produce a modifier signal. If the absolute value of the maximum signal is less than the absolute value of the minimum signal, the inverted minimum signal is added to the negative of the peak magnitude of the carrier to produce the modifier signal. The modifier signal is added to each of the sinusoidal reference signals for providing a plurality of modified reference signals to the inverter/converter, one modified reference signal provided to each leg.

14 Claims, 6 Drawing Sheets

PULSE WIDTH MODULATION METHOD FOR DRIVING THREE PHASE POWER INVERTER/CONVERTER SWITCHES WITH BALANCED DISCONTINUOUS PHASE COMMANDS

FIELD OF THE INVENTION

The present invention relates to pulse width modulated voltage conversion and, in particular, to an apparatus and/or method for producing a reference voltage for use by a pulse width modulating inverter/converter to balance positive and negative inverter/converter switch duty cycles while at the same time reducing commutation losses and increasing inverter output.

DESCRIPTION OF THE ART

Many motor applications require that a motor be driven at various speeds. Motor speed can be adjusted with an adjustable speed drive (ASD) which is placed between a voltage source and an associated motor that can excite the motor at various frequencies. One commonly used type of ASD uses a pulse width modulated (PWM) inverter and associated PWM controller which can control both voltage and frequency of signals that eventually reach motor stator windings.

Figure 1A:
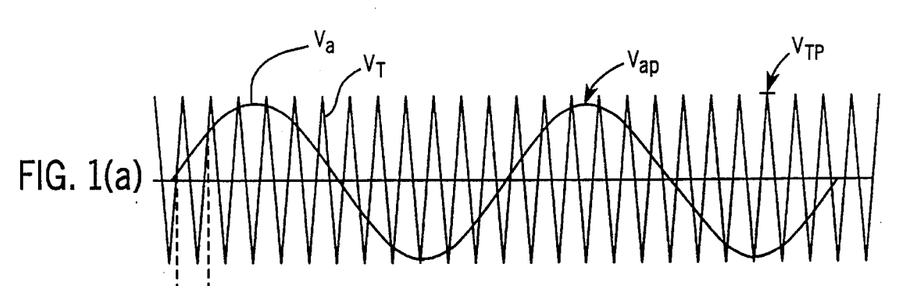
FIG. 1(a) is a graph illustrating triangle and reference signals.
Figure 1B:
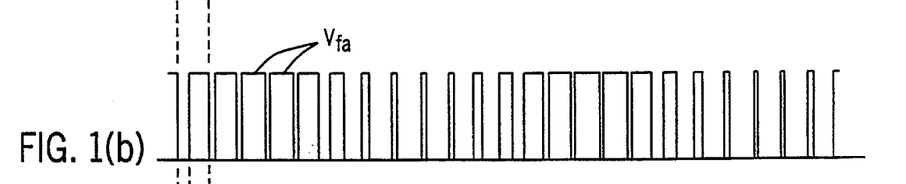
FIG. 1(b) is a graph illustrating resultant switching signals.
Figure 1C:
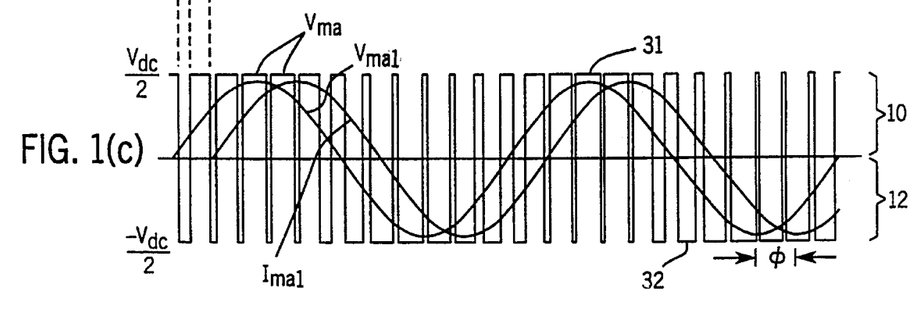
FIG. 1(c) is a graph illustrating the high frequency pulses generated by a PWM inverter, the resulting low frequency alternating voltage associated to, and an associated alternating current provided to, a stator winding by a PWM inverter.

Referring to FIGS. 1(a)–1(c), although only a single reference voltage $V_a$ and signals generated therefrom are illustrated, it should be understood that a three phase PWM inverter for controlling a three phase motor is driven by three such reference voltages, a separate reference voltage corresponding to each of the three motor phases (i.e., each of three motor stator windings). In the interest of providing a simple explanation of a PWM inverter only one reference voltage $V_a$ and signals generated therefrom are explained here in detail.

Referring specifically to FIGS. 1(a) and 1(b), a PWM controller receives three reference signals $V_a$ and a triangle signal $V_T$, compares each reference and triangle signal $V_a$, $V_T$, and generates a switching signal $V_{fa}$ corresponding to each reference signal. When a reference signal $V_a$ is greater than the triangle signal $V_T$, a corresponding switching signal $V_{fa}$ is high. When a reference signal $V_a$ is less than the triangle signal $V_T$, a corresponding switching signal $V_{fa}$ is low.

The switching signals $V_{fa}$ are used to control an associated PWM inverter. A PWM inverter consists of a plurality of switches that alternately connect associated motor stator windings to positive and negative DC voltage buses to produce a series of high frequency voltage pulses that excite the stator windings.

Referring to FIG. 1(c), an exemplary sequence of high frequency pulses $V_{ma}$ that an inverter might generate across a stator winding can be observed along with an exemplary low frequency alternating voltage $V_{mal}$. $V_{mal}$ is the fundamental component of $V_{ma}$. The high frequency pulses $V_{ma}$ are positive when the switching signal $V_{fa}$ is high and negative when the switching signal $V_{fa}$ is low. The maximum magnitude of each pulse $V_{ma}$ is half the DC potential between positive and negative DC bus lines. Thus, where the DC potential is $V_{dc}$, the maximum magnitude is $+V_{dc}/2$ and the minimum magnitude is $-V_{dc}/2$.

By firing the PWM switches according to the switching signals $V_{fa}$, the widths of the positive portions 10 of each high frequency pulse relative to the widths of the negative portions 12 over a series of high frequency pulses $V_{ma}$ varies. The varying widths over a reference signal period generate the low frequency alternating voltage $V_{mal}$. When a simple sinusoidal reference signal $V_a$ is used and the triangle signal $V_T$ has a high frequency, the generated alternating voltage $V_{mal}$ approximately linearly tracks the reference signal $V_a$ and is sinusoidal.

The low frequency alternating voltage $V_{mal}$ in turn produces a low frequency alternating current $I_{mal}$ that lags the voltage by a phase angle $\phi$. The low frequency alternating current $I_{mal}$ drives the motor which operates at the frequency of the alternating current $I_{mal}$.

By changing the frequency of the reference signal $V_a$, the frequency of the alternating current $I_{mal}$, and thus the motor speed, can be altered. For example, by increasing the frequency of the reference signal $V_a$, the frequency of the alternating current can be increased and motor speed can in turn be increased. Motor speed can be decreased by decreasing the sinusoidal reference signal $V_a$ frequency.

Use of PWM inverters in motor drive applications has been considered advantageous for a number of reasons. In industrial applications, the PWM drive is particularly advantageous as it obtains its DC input through simple uncontrolled rectification of the commercial AC line, can obtain a good power factor, is efficient, is relatively free of regulation problems, and can operate the motor with nearly sinusoidal current waveforms.

However, use of purely sinusoidal PWM reference signals has proven unsatisfactory for a number of reasons. For example, referring again to FIG. 1(a), an amplitude modulation index $m_a$ is defined as the ratio of the peak reference signal value $V_{ap}$ and the peak triangle signal value $V_{mp}$. By increasing the modulation index $m_a$, the amplitude of the changing voltage $V_{mal}$ can be increased. However, where the modulation index $m_a$ exceeds one (i.e. $V_{ap} > V_{TP}$), during extreme high and low portions of the reference signal $V_a$, the reference signal $V_a$ and triangle signal do not intersect and switching is discontinued.

During these times, because switching is discontinued, the PWM inverter cannot alter the low frequency alternating voltage $V_{mal}$ to reflect variations in reference signal amplitude. The PWM inverter is said to be saturated and the relationship between the alternating voltage $V_{mal}$ and the reference signal $V_a$ becomes nonlinear. Thus, reference signal $V_a$ and alternating voltage $V_{mal}$ linearity can only be maintained up to a modulation index $m_a$ of one.

In addition, because the high frequency pulses $V_{ma}$ are generated by connecting the motor stator windings between the positive and negative DC buses, where one stator winding is connected to the positive bus and another is connected to the negative, the maximum line-to-line potential across the two windings should be equal to the entire DC bus potential (i.e. $V_{dc}$).

For a sinusoidal three phase system:

$$V_{LL} = (m_a)(\sqrt{3})(V_{mal}) \qquad (1)$$

where $V_{LL}$ is the maximum line to line voltage and $V_{mal}$ is the low frequency alternating voltage across a single phase of the motor. The maximum phase voltage $V_{mal}$ is $$\frac{V_{dc}}{2}$$

and thus the maximum line-to-line voltage is $$(m_a) (\sqrt{3}) \left( \frac{V_{dc}}{2} \right).$$

Where the modulation index $m_a$ is 1, the maximum line-to-line potential $V_{LL}$ is $$\left( \frac{\sqrt{3}}{2} \right) (V_{dc}).$$

This value is 15.4% lower than the theoretical maximum line-to-line potential $V_{dc}$. The possibility of driving a PWM with other than sinusoidal reference signals to increasing the load voltages by 15.4% without saturation is clear and has been generally recognized within the industry.

Moreover, as PWM inverter switches are opened and closed, PWM inverter output is diminished by conduction and switching losses. These losses are directly related to the duration of switch conducting time and the number of times the reference and triangle signals $V_a$, $V_T$ intersect respectively. Unfortunately, a sinusoidal reference signal $V_a$ where $m_a \leq 1$ intersects the triangle signal $V_T$ the maximum number of times per cycle producing high switching losses.

Blasko, U.S. Pat. No. 5,153,821, issued on Oct. 6, 1992, describes one method which uses a non-sinusoidal reference signal to maximize voltage output. This method provides modified non-sinusoidal reference signals to the PWM inverter. The method generates the modified reference signals by detecting the maximum of three sinusoidal reference signals, subtracting the maximum from the peak value of a triangle signal to produce a difference, and adding the difference to each of the three reference signals.

The result is that when one of the three reference signals is greater than the other two, the switches controlled by the greater reference signal connect the positive DC bus to an associated stator winding while the other switches are opened and closed in response to the modified reference signals. In this manner, at any given instant only two of the three stator winding currents are independently controlled by PWM manipulation while the third current, associated with the greatest of the three reference signals, is controlled by the other two currents. Thus, by keeping one of the stator windings connected to a DC bus at all times, all three load currents are generated by the switching of switches associated with only two stator windings.

In addition to increasing the maximum output voltage by 15.4%, this method also extends the inverter's linear range of operation. Where a specific reference signal is greater than the triangle signal $V_T$ during a specific period so that the modulation index $m_a$ is greater than 1, this method alters all three reference signals. The specific reference signal is modified to equal the peak value of the triangle signal during the specific period and the other two reference signals are modified so that the line-to-line output voltage remains sinusoidal despite the modified specific reference signal. In this manner, the linear range of inverter operation is extended to the point where the modulation index $m_a$ is equal to 1.1547, a 15.4% increase of the linear range where the reference voltages are purely sinusoidal.

Moreover, where the modulation index $m_a$ is 1.1547, during prolonged periods one stator winding is connected to the DC bus. Therefore during those prolonged periods, switches associated with the DC connected stator winding do not switch, one is open and non-conducting while the other is closed and conducting. Thus, switching losses can be reduced by as much as one-third.

Unfortunately, this method also has problems. In particular, because one stator winding is constantly connected to the positive DC bus, the switches connecting the stator windings to the positive DC bus conduct one-third more than the switches connecting the stator windings to the negative DC bus. This produces increased conduction losses through the conducting switches and they heat up more than switches that do not conduct which could adversely affect the useful life of the excessively conducting switches. In addition, this can result in an unbalanced voltage.

In "New PWM Technique Using A Triangular Carrier Wave Of Saturable Amplitude", by Tung Hai Chin, et al. published in IEEE-Transaction on Industry Applications, Vol. IA-20, No. 3, pg. 643, May/June, 1984, another method of driving a PWM inverter with a non-sinusoidal reference signal is described wherein all PWM switches conduct for identical portions of motor cycles. However, this method and others in the art like it, require angle and frequency information in order create the non-sinusoidal reference signals. Being based on angle and frequency information, these methods do not yield correct results if the reference voltages are asymmetrical or have a DC offset, both of which are often encountered in motor controls.

Thus, it would be advantageous to have a method and/or apparatus for providing reference signals to a PWM inverter that generates maximum line-to-line voltage, extends linearity, reduces switching losses, and drives all PWM switches according to approximately balanced duty cycles without the need for precise angle and frequency information.

SUMMARY OF THE INVENTION

The present invention includes a method of voltage conversion using a pulse with modulator and an inverter/converter. The inverter/converter includes three legs and provides a triangle carrier signal.

The method provides a plurality of sinusoidal reference signals, the reference signals displaced one from another by a phase angle, one signal associated with each leg, detects a maximum value of the reference signals for providing a maximum signal, detects a minimum value of the reference signal for providing a minimum signal, determines the absolute value of the maximum and minimum signals producing absolute maximum and absolute minimum signals, and if the absolute maximum signal is greater than or equal to the absolute minimum signal, mathematically combines the maximum signal with the peak value of the triangle carrier signal to produced a modifier signal. If the absolute maximum signal is less than the absolute minimum signal, the minimum signal is combined with the peak value of the triangle carrier signal to produce the modifier signal. The modifier signal is added to the sinusoidal reference signals for providing a plurality of modified reference signals to the inverter/converter, one modified reference signal associated with each leg.

Preferably, the step of mathematically combining the maximum signal with the peak value of the triangle carrier signal includes the step of subtracting the maximum signal from the peak value of the triangle carrier signal. Also, preferably, the step of mathematically combining the minimum signal with the peak value of the triangle carrier signal includes the steps of inverting the peak value of the triangle carrier signal for producing an inverted signal and adding the inverted signal to the minimum signal.

Thus, one object of the present invention is to provide a method by which phase reference signals can be altered and provided to a PWM inverter/converter that will drive all PWM switches in a balanced manner over a period of the fundamental reference voltage. By generating the modifier signal as indicated above, and adding the modifier signal to each of the reference signals to produce modified reference signals for driving the inverter, each stator winding is tied to the negative DC bus for a period which is approximately identical to the period over which it is tied to the positive DC bus. Thus, the switch between a negative DC bus and a stator winding conducts for the same amount of time as does an associated switch between the stator winding and a positive DC bus. Conduction losses are therefore approximately identical between associated switches and motor control is more exact.

Another object is to drive all inverter/converter switches to provide equal losses in all switches without the need for precise angle and frequency information. Prolonged DC connection is purely a function of the greatest magnitude, either positive or negative, of any of the reference signals, and is wholly unrelated to specific angles or frequencies of the reference signals. Thus, even where a reference signal is characterized by a frequency error or DC offset, the present invention will still operate properly.

Yet other objects of the present invention is to generate maximum line-to-line voltage using a PWM inverter/converter, extend linear operation of the inverter/converter, and reduce switching losses. Like other non-sinusoidal reference signal methods, by driving the inverter/converter with the modified reference signals of the present invention, the maximum line-to-line voltage can be increased by as much as 15.4% without distortion. Moreover, the linear relationship between changing average voltage and the reference signals is extended to the point where the modulation index $m_a=1.1547$. Furthermore, as with other non-sinusoidal reference signals known in the art, the present method eliminates approximately one-third of the switching which is required where a sinusoidal reference signal is used.

DESCRIPTION OF THE PREFERRED EMBODIMENT

Figure 2:
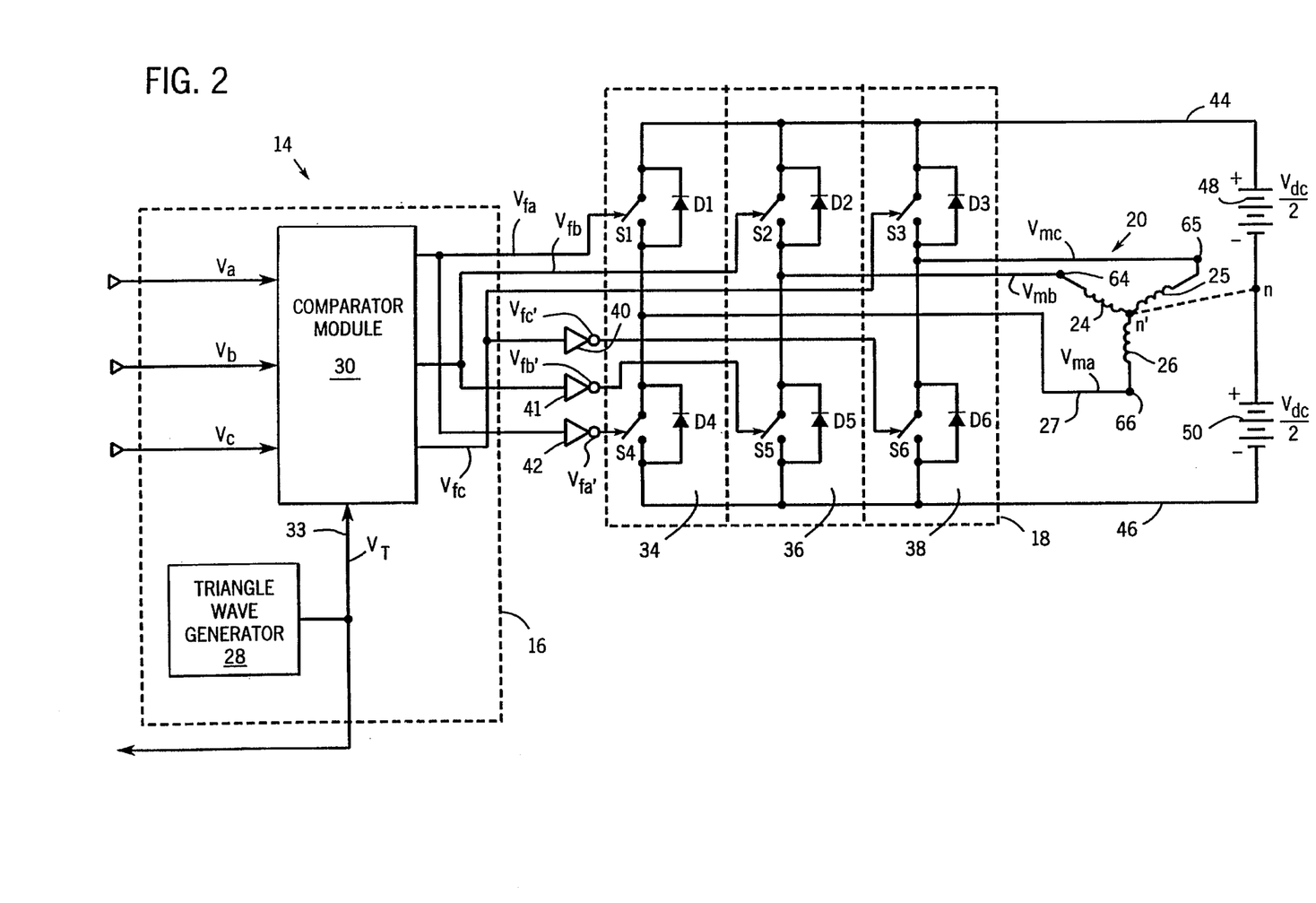
FIG. 2 is a schematic diagram of a motor control system.

Referring to FIG. 2, the present invention will be described in the context of an exemplary motor control system 14 including a PWM controller 16 and a PWM inverter 18.

The PWM controller 16 includes a triangle wave generator 28 and a comparator module 30. Referring also to FIG. 1(a), the triangle wave generator 28 produces the triangle signal $V_T$ which is provided to the comparator module 30 along line 33. In addition, the comparator module 30 receives three reference signals $V_a$, $V_b$, $V_c$ (only one reference signal $V_a$ is illustrated in FIG. 1 in order to simplify this description). The comparator module 30 compares each of the three references signals $V_a$, $V_b$, $V_c$ to the triangle signal $V_T$ and produces three switching signals $V_{fa}$, $V_{fb}$, $V_{fc}$. Referring also to FIG. 1(b), where a reference signal $V_a$, $V_b$, $V_c$ is greater than the triangle signal $V_T$, the comparator module 30 produces a corresponding switching signal $V_{fa}$, $V_{fb}$, $V_{fc}$ which is "high". Where a reference signal $V_a$, $V_b$, $V_c$ is less than the triangle signal $V_T$, the comparator module 30 produces a corresponding switching signal $V_{fa}$, $V_{fb}$, $V_{fc}$ which is "low". Thus, three pulsating switching signals $V_{fa}$, $V_{fb}$, $V_{fc}$, are produced that vary in width according to the amplitude of associated reference signals $V_a$, $V_b$, $V_c$. The switching signals $V_{fa}$, $V_{fb}$, $V_{fc}$ are provided to the PWM inverter 18.

The inverter 18 includes three pairs of switches S1–S6 (BJT, GTO, IGBT or other transistor technology may be used). Each pair includes an upper switch S1, S2, S3 and a lower switch S4, S5, S6, and each pair is arranged as one of three parallel legs 34, 36, 38, connecting positive and negative DC buses 44, 46 respectively. Each switch S1–S6 is coupled with an inverse parallel connected diode D1–D6. Such diodes and their function are well known in the art. A separate three phase winding 24, 25, 26 is electrically connected at one end between the switches S1–S6 in each leg 34, 36, 38.

Each switching signal $V_{fa}$, $V_{fb}$, $V_{fc}$ is provided to one of the upper switches S1, S2, S3. In addition, each switching signal $V_{fa}$, $V_{fb}$, $V_{fc}$ is inverted by a separate inverter 40, 41, 42 producing inverted switching signals $V_{fa}^1$, $V_{fb}'$, $V_{fc}'$. Each inverted switching signal $V_{fa}'$, $V_{fb}'$, $V_{fc}'$, is provided to a separate one of the lower switches S4, S5, S6.

When the inverter switches S1–S6 are controlled by the firing and inverted switching signals, as an upper switch S1, S2, or S3 goes high, a corresponding lower switch S4, S5, or S6 goes low. When an upper switch goes low, a corresponding lower switch in the same leg goes high.

A DC voltage source connects the positive and negative DC busses 44, 46. For the purpose of this description, the DC source can be thought of as consisting of both positive and negative series arranged DC sources 48, 50 respectively, that connect the positive and negative DC buses 44, 46. The positive terminal of the positive source 48 is connected to the positive DC bus 44 and its negative terminal is connected at a node n to the positive terminal of the negative DC source 50. The negative terminal of the negative DC source 50 is connected to the negative DC bus 46. Both DC voltage sources 48, 50 produce potentials of identical magnitude but of opposite signs with respect to central point n on the DC voltage source.

Because each of the three inverter legs 34, 36, 38 operate in the same manner, in order to simplify the description of the PWM inverter, operation of only a single leg 34 will be explained in detail here. Because only leg 34 is described here, only components related to that leg 34, (i.e. switches 51 and 54 and winding 26) are explained. In the single phase explanation, current passing through winding 26 must be grounded. The broken line in FIG. 2 represents a single phase ground from point n' to central node n.

Referring to FIGS. 1(b), 1(c), and 2, when the switching signal $V_{fa}$ is received by the inverter 18, the signal $V_{fa}$ is directed to the first switch S1 whereas the corresponding inverted signal $V_{fa}'$ is directed to the other switch S4 in leg 34. When switching signal $V_{fa}$ is high and $V_{fa}'$ is low, the first switch S1 is closed and the fourth switch S4 is opened. In this state, stator winding 26 is connected through line 27 and the first switch S1 to the positive DC bus 44. This produces a positive DC voltage pulse 31 across stator winding 26. This positive pulse 31 has an amplitude equal to the magnitude of the positive DC voltage source 48 (i.e. $+V_{dc}/2$) and a width equal to the width of the switching signal $V_{fa}$. Current passing through winding 26 passes from node n to node n'. It should be understood that, although the ground between notes n' and n is necessary in single phase, because node n' must have zero current therethrough (i.e. $I_a+I_b+I_c=0$) in three phase, the dashed ground does not exist in the three phase circuit.

When the switching signal $V_{fa}$ goes low, the inverted switching signal $V_{fa}'$ goes high. During this time, switching signal $V_{fa}$ opens the first switch S1 and the inverted switching signal $V_{fa}'$ closes the fourth switch S4. This disconnects stator winding 26 from the positive DC bus 44 and shortly thereafter connects the stator winding 26, through line 27 and the fourth switch S4, to the negative DC bus 46. When so connected, a negative DC pulse 32 is generated between central node n and node 66 having an amplitude equal to the magnitude of the negative DC voltage source 50 (i.e. $-V_{dc}/2$) and a width equal to the width of the space between switching signal $V_{fa}$ pulses.

By changing the widths of the positive DC pulses 31 with respect to the widths of the negative DC pulses 32 rapidly over time, a changing average voltage or low frequency alternating voltage $V_{mal}$ which follows the command voltage $V_a$ can be provided across the stator winding 26. This alternating voltage $V_{mal}$ gives rise to an alternating current $I_{mal}$ which lags the voltage by a phase angle $\Phi$.

Figure 3:
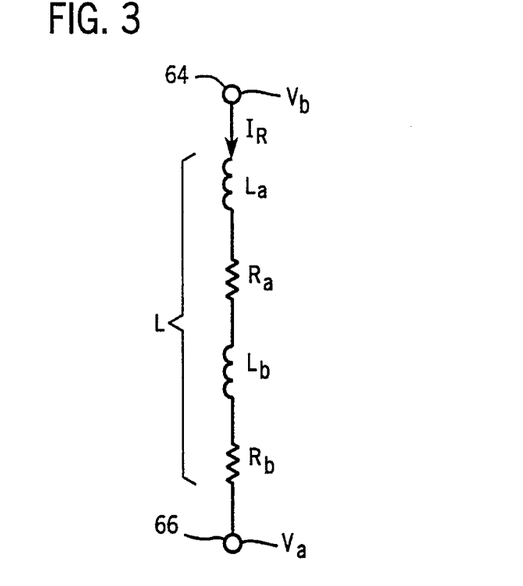
FIG. 3 is a simple circuit representing two of the three phases of a three phase motor.

Referring now to FIG. 3, a simple impedance circuit including two resisters $R_a$, $R_b$ and two inductors $L_a$, $L_b$ sandwiched between two nodes 64, 66 can be observed. Referring also to FIG. 2, the nodes 64, 66 correspond to winding terminals of the motor 20, resistor $R_a$ and inductor $L_a$ represent phase impedance of winding 26, and resistor $R_b$ and inductor $L_b$ represent phase impedance of winding 24. The components provide a combined impedance L between the two nodes 64, 66.

There are many different ways in which to vary the potential between nodes 64, 66 in order to generate an alternating current $I_R$ through impedance L. The potential between two nodes 64, 66 can remain identical despite variations in voltage at one node if the voltage at the other node also varies in the same manner. For example, assuming the voltage $V_b$ at node 64 is 10 v and the voltage $V_a$ at node 66 is 5 V, the potential between $V_b$ and $V_a$ is $V_b-V_a=5$ V. Now, if voltages $V_a$ and $V_b$ are increased by identical voltages $\Delta V$, the potential between the two nodes 64, 66 will be $(v_b+\Delta V)-(V_a+\Delta V)=V_b-V_a=5$ V.

Similarly, alternating current can be provided between two nodes 64, 66 by varying either one or both of the voltages $V_a$, $V_b$ to change potential in an alternating fashion. For example, by trying one node to negative 5 V and varying the voltage at the other node between 0 and 10 V, an alternating current can be provided.

Similarly, referring again to FIG. 2, in a three phase motor, where three electrical nodes 64, 65, 66 correspond to three windings 24, 25, 26 which are connected in a Y configuration at a central node n', either three or two alternating voltage sources can be used to generate alternating currents in all three motor windings. Where only two alternating voltages determine the currents through the windings 24, 25, 26, the third voltage can be tied to a DC bus, either positive or negative. When this is done, the sequence of switch firing must be altered for the other two nodes to produce sinusoidal line-to-line voltages.

The present invention includes a method and an apparatus for altering the switching sequence of inverter/converter switches so as to connect one of the nodes 64, 65, 66 to the positive or negative DC buses 44, 46 for prolonged periods. At the same time, the other two nodes that are provided with voltages that are altered to compensate for the prolonged DC connection of the third node.

Figure 4:
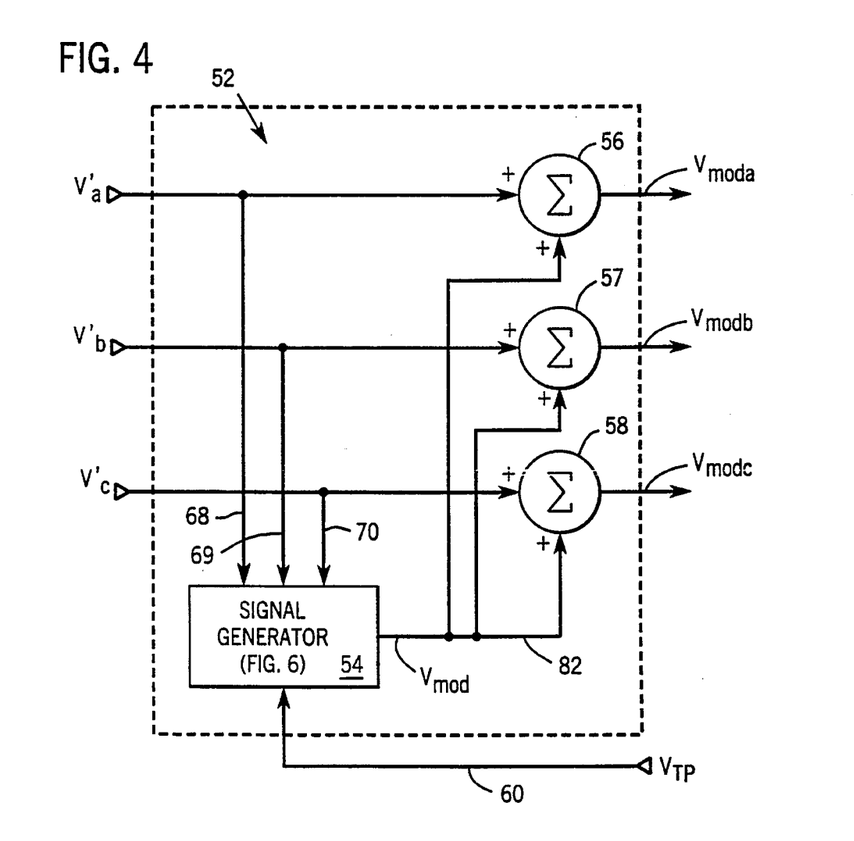
FIG. 4 is a schematic of a reference voltage modifier according to the present invention.
Figure 5:
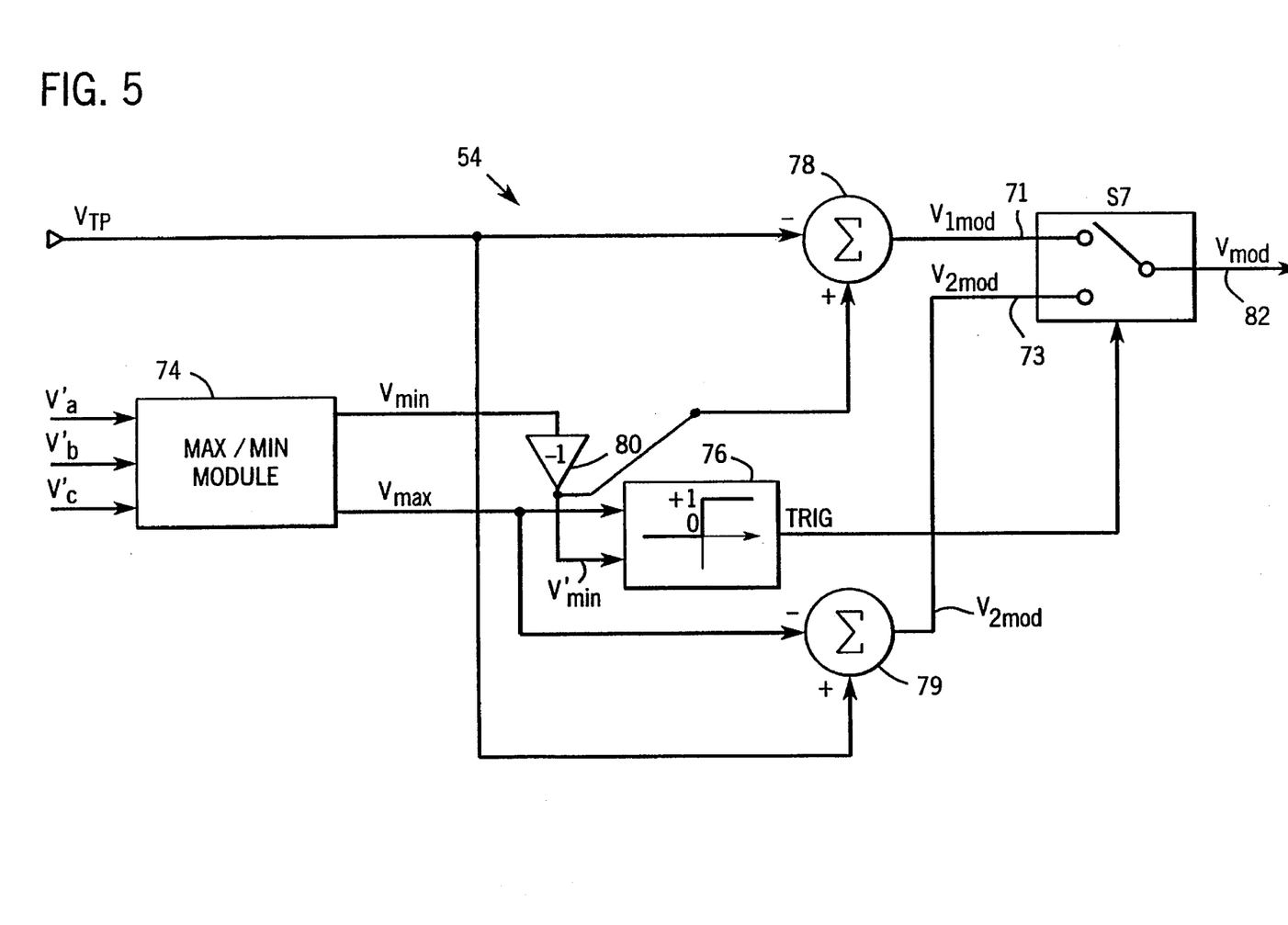
FIG. 5 is a schematic diagram of the signal generator shown in FIG. 4.

Referring to FIG. 4, a reference voltage modifier 52 includes a signal generator 54 and three summers 56, 57, and 58. The signal generator 54 receives sinusoidal initial reference signals $V_a'$, $V_b'$, $V_c'$ on lines 68, 69 and 70 and the triangle signal $V_T$ on line 60. The initial reference signals $V_a'$, $V_b'$, $V_c'$ usually form a three phase balanced system. Referring also to FIG. 5, the signal generator 54 includes a Max/Min module 74, a comparator 76, and various other components that will be described in more detail below.

A peak signal $V_{TP}$ corresponding to the highest amplitude of the triangle signal $V_T$ is provided. This signal is known as it is required to produce the triangle signal $V_T$. The Max/Min module 74 receives all three initial reference signals $V_a'$, $V_b'$, and $V_c'$ and determines which initial reference signal $V_a'$, $V_b'$, or $V_c'$ has the greatest amplitude and which has the least amplitude. The initial reference signal having the greatest amplitude is passed on as a maximum voltage signal $V_{max}$. The initial reference signal having the least amplitude is passed on as a minimum voltage signal $V_{min}$. Because all of the initial reference signals are approximately sinusoidal and have approximately the same amplitude, the initial reference signal passed on as $V_{max}$ will alternate between all three initial reference signals. Similarly, which signal is passed on as $V_{min}$ will also vary over time.

A first summer 78 subtracts the peak signal $V_{TP}$ from the minimum inverted voltage signal $V_{min}$ producing a first modifier signal $V_{1mod}$. A second summer 79 subtracts the maximum voltage signal $V_{max}$ from the peak signal $V_{TP}$ producing a second modifier signal $V_{2mod}$. Both the first and second modifier signals $V_{1mod}$, $V_{2mod}$ are provided to a single pole double throw switch S7 on lines 71, 73 respectively.

The minimum voltage signal $V_{min}$ is also provided to an inverting amplifier 80 with a gain of negative one which produces an inverted minimum signal $V_{min}'$. The comparator 76 receives both the inverted minimum voltage signal $V_{min}'$ and the maximum voltage signal $V_{max}$. If the maximum voltage signal $V_{max}$ is greater than the inverted minimum voltage signal $V_{min}'$, comparator 76 produces a trigger signal TRIG=1. However, where the maximum voltage signal $V_{max}$ is less than the inverted minimum voltage signal $V_{min}'$, comparator 76 produces a trigger signal TRIG=0.

The trigger signal TRIG is supplied to and controls switch S7. When TRIG=1, switch S7 connects an output line 82 to line 73 so that the second modifier signal $V_{2mod}$ is passed on as modifier signal $V_{mod}$. When TRIG=0, switch S7 connects the output line to line 71 so that the first modifier signal $V_{1mod}$ is passed on as modifier signal $V_{mod}$.

Figure 6:
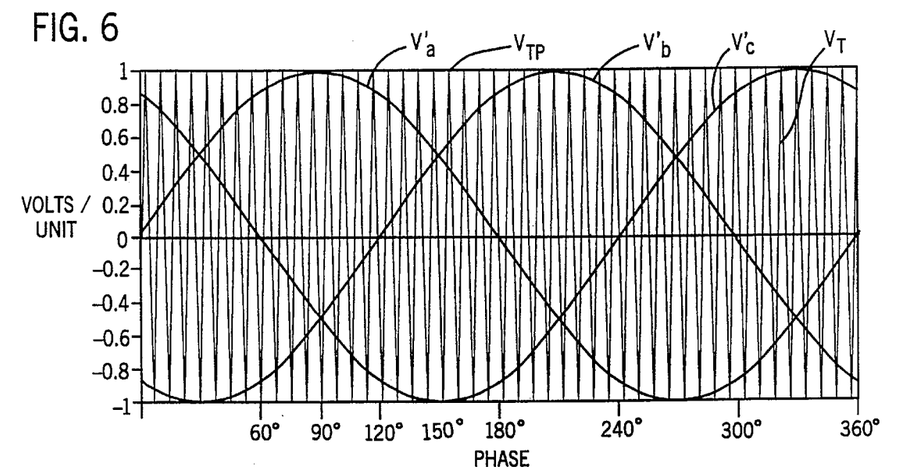
FIG. 6 is a graph illustrating triangle and reference signals wherein the modulation index $m_a$ is equal to 1.

Referring now to FIGS. 5 and 6, three initial reference signals $V_a'$, $V_b'$, $V_c'$ and a typical high frequency triangle signal $V_T$ can be observed. For the purposes of simplifying this description reference will be made below to angles to describe various signals in relation to FIGS. 6–11. However, it should be clearly understood that reference to these angles does not imply that the present invention operates in an angle dependent manner. Operation of the present invention is solely tied to maximum and minimum reference signal values which may correspond to periodic angles and may not correspond to periodic angles.

Referring specifically to FIG. 5 and the section of the FIG. 6 graph between 60° and 120°, the maximum voltage signal within this section includes the upper crest portion of initial reference signal $V_a'$. Thus initial reference signal $V_a'$ is passed on as maximum voltage signal $V_{max}$ between 60° and 120°.

Between 60° and 90°, the minimum voltage signal includes a portion of initial reference signal $V_b'$ whereas between 90° and 120° the minimum voltage signal includes a portion of initial reference signal $V_c'$. Thus between 60° and 90°, initial reference signal $V_b'$ is passed as the minimum voltage signal $V_{min}$ and between 90° and 120° initial reference signal $V_c'$ is passed as $V_{min}$.

Between 60° and 120° the comparator 76 compares the absolute values of the maximum voltage $V_{max}$ ($V_a'$) and minimum voltage $V_{min}$ ($V_b'$ and $V_c'$). During the 60°–120° period '$V_a'$' is greater than '$V_b'$' or '$V_c'$' and therefore the trigger signal TRIG is equal to 1 connecting output line 82 to line 73 so that the second modifier signal $V_{2mod}$ is passed as the modifier signal $V_{mod}$.

Figure 7:
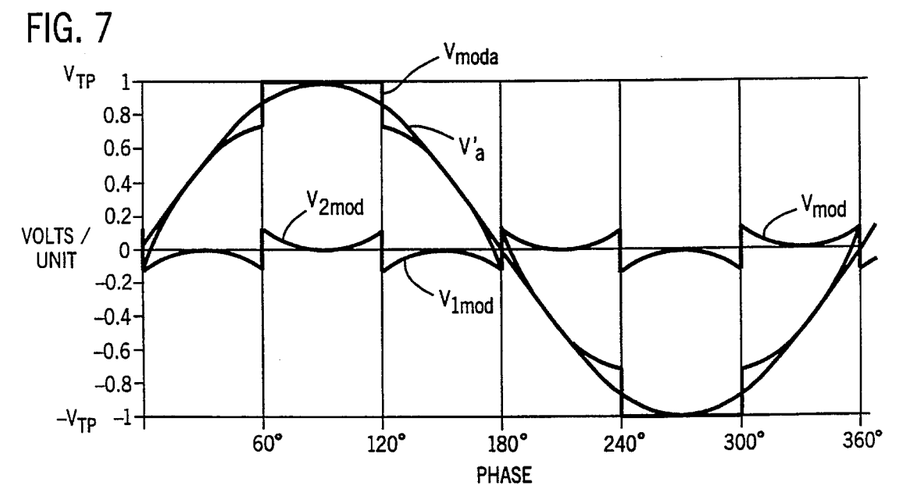
FIG. 7 is a graph illustrating one reference signal, a modifier signal, and a modified reference signal.

Referring still to FIGS. 5 and 6, at summer 79, the upper crest of initial reference signal $V_a'$ between 60° and 120° is subtracted from the peak value $V_{TP}$ to produce the second modifier signal $V_{2mod}$. Referring also to FIG. 7, $V_{2mod}$ can be observed between 60° and 120°.

Referring again to FIG. 5 and specifically to the section of FIG. 6 between 120° and 180°, the minimum voltage signal within this section includes the lower crest portion of initial reference signal $V_c'$. Thus, initial reference signal $V_c'$ is passed as the minimum voltage $V_{min}$ between 120° and 180°.

Between 120° and 150°, the maximum voltage signal includes a portion of initial reference signal $V_a'$ whereas between 150° and 180° the maximum voltage signal includes a portion of initial reference signal $V_b'$. Thus, between 120° and 150°, initial reference signal $V_a'$ is passed as the maximum voltage $V_{max}$ and between 150° and 180°, initial reference signal $V_b'$ is passed as $V_{max}$.

Between 120° and 180°, the comparator 76 compares the absolute values of the minimum voltage signal $V_{min}$ ($V_c'$) and maximum voltage signal $V_{max}$ ($V_a'$ and $V_b'$). During the 120°–180° period '$V_c'$' is greater than '$V_a'$' or '$V_b'$' and therefore the trigger signal TRIG is equal to 0 connecting output line 82 to line 71 so that the first modifier signal $V_{1mod}$ is passed as the modifier signal $V_{mod}$.

Referring still to FIGS. 5 and 6, at summer 78 the peak value $V_{TP}$ is subtracted from the inverted lower crest of the initial reference signal $V_c'$ between 120° and 180° to produce the first modifier signal $V_{1mod}$. Referring also to FIG. 7, the first modifier signal $V_{1mod}$ can be observed between 120° and 180°.

As can be seen in FIG. 7, approximately every 60 degrees, the switch S7 switches connection between lines 71 and 73 producing a discontinuously shaped modifier signal $V_{mod}$. Importantly, while divisions of 60 degrees were used to describe this part of the invention, it is not imperative that switch S7 alternate between lines 71 and 73 at precise 60 degree intervals. Alternating is purely a function of maximum reference signal amplitude, not angle. Thus, even where the frequency of a reference signal is off or a DC offset voltage is included in one of the reference signals for some reason, the method of the present invention will still operate properly.

Referring again to FIG. 4, the modifier signal $V_{mod}$ is supplied along line 82 to the summers 56, 57, 58. Each summer 56, 57, 58 also receives an initial reference signal $V_a'$, $V_b'$, and $V_c'$ and adds the modifier signal $V_{mod}$ thereto. Thus, each summer 56, 57, 58 produces a modified reference signal $V_{moda}$, $V_{modb}$, $V_{modc}$ for input to the PWM controller 16 as reference signals $V_a$, $V_b$ and $V_c$.

Referring to FIG. 7, an exemplary modified reference signal $V_{moda}$ and an initial reference signal $V_a'$ illustrated for comparisons sake, can be observed. Referring to the period between 60° and 120°, when the modifier signal $V_{mod}$ is added to the initial reference signal $V_a'$, the modified reference signal $V_{moda}$ has an amplitude equal to the peak value $V_{TP}$. Similarly, between 240° and 300°, when the modifier signal $V_{mod}$ is added to the initial reference signal $V_a'$ the resulting modified reference signal $V_{moda}$ has an amplitude equal to the negative peak value $-V_{TP}$.

Figure 8:
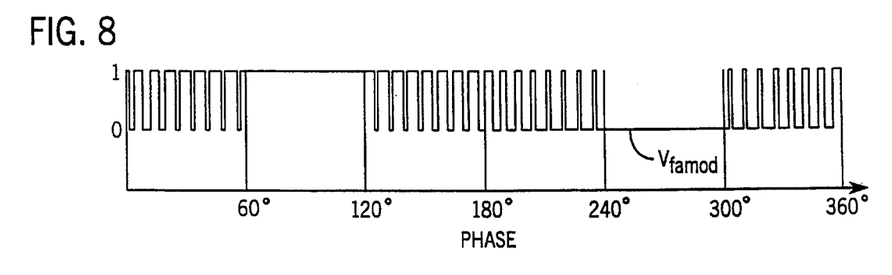
FIG. 8 is a graph illustrating switching signals corresponding to the modified reference signal of FIG. 7.

Referring to FIGS. 7 and 8, because the modified reference signed $V_{moda}$ is equal to the peak value $V_{TP}$ between 60° and 120°, the two signals do not intersect during this period and therefore, the switches associated with this reference signal $V_{moda}$ do not switch. Because the modified reference signal $V_{moda}$ is equal to or greater than the peak value $V_{TP}$, a switching signal $V_{famod}$ remains high between 60° and 120°. Between 240° and 300°, where the modified signal $V_{moda}$ is equal to $-V_{TP}$, the switching signal $V_{famod}$ remains low.

Thus, during two 60° intervals, or a total of 120° of a 360° period, the switches associated with modified reference signal $V_{moda}$ fully conduct and switching losses are reduced by one third. In addition, over the course of each full operational period, the switches within a PWM leg conduct for the same amount of time so that conduction losses between switches connected to the positive DC bus and those connected to the negative DC bus should be nearly identical.

Because the stator winding is periodically connected directly to the positive and negative DC buses for 60° periods between 60° and 120° and 240° and 300° respectively, the line 64, 65 or 66 to central node n voltage is not sinusoidal. However, a sinusoidal line-to-line voltage results when modified reference signals according to the present inventions are used to drive a PWM inverter.

Figure 9:
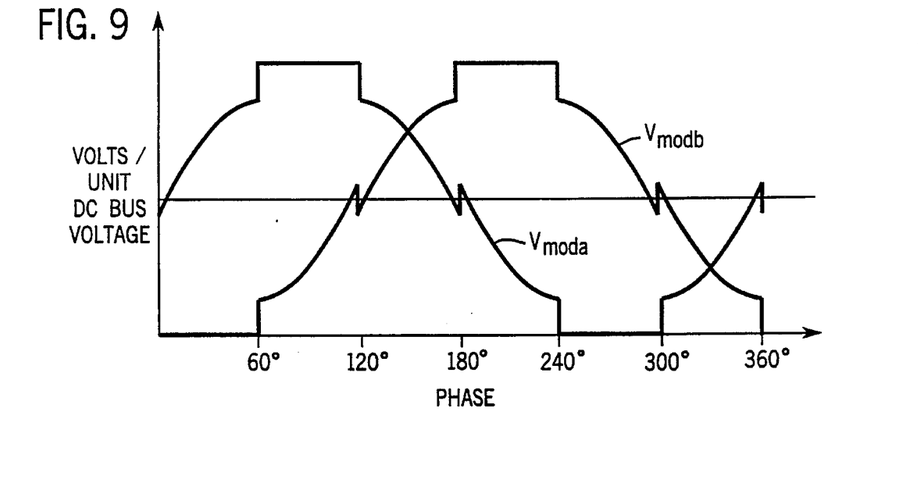
FIG. 9 is a graph illustrating two low frequency alternating modified phase voltage commands according to the present invention.

For example, referring to FIGS. 9, two modified reference voltages $V_{moda}$, $V_{modb}$ according to the present invention can be observed. The line-to-line command voltage associated with the two voltages $V_{moda}$, $V_{modb}$ is:

$$V_{LL} = (V_a' + V_{mod}) - (V_b' + V_{mod}) = V_{moda} - V_{modb} \tag{2}$$

This simplifies to:

$$V_{LL} = V_a' - V_b' \qquad (3)$$

Figure 10:
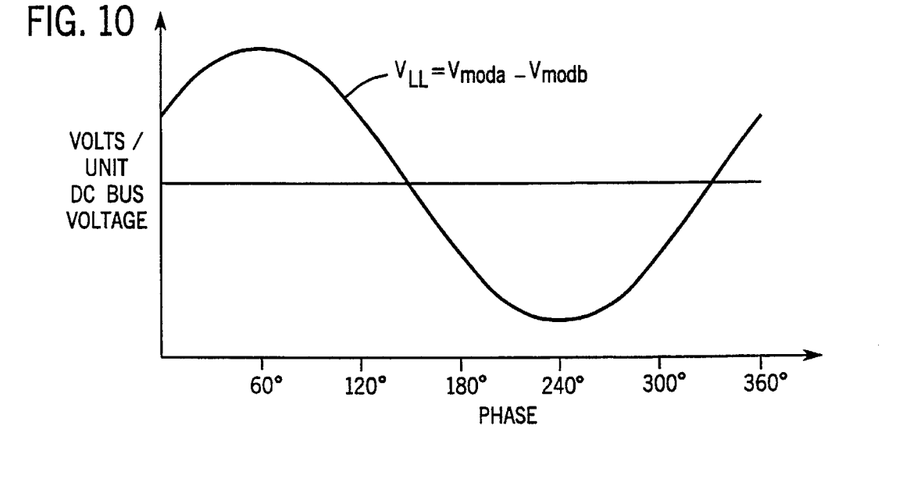
FIG. 10 is a graph illustrating the line-to-line voltage resulting from the two low frequency alternating modified phase voltage commands in FIG. 9.

Referring also to FIG. 10, subtracting $V_{modb}$ from $V_{moda}$ in FIG. 9 gives the line-to-line voltage $V_{LL}$ shown in FIG. 10. Note that the line-to-line voltage $V_{LL}$ is sinusoidal despite the discontinuous modified reference phase voltage commands $V_{moda}$, $V_{modb}$.

Figure 11:
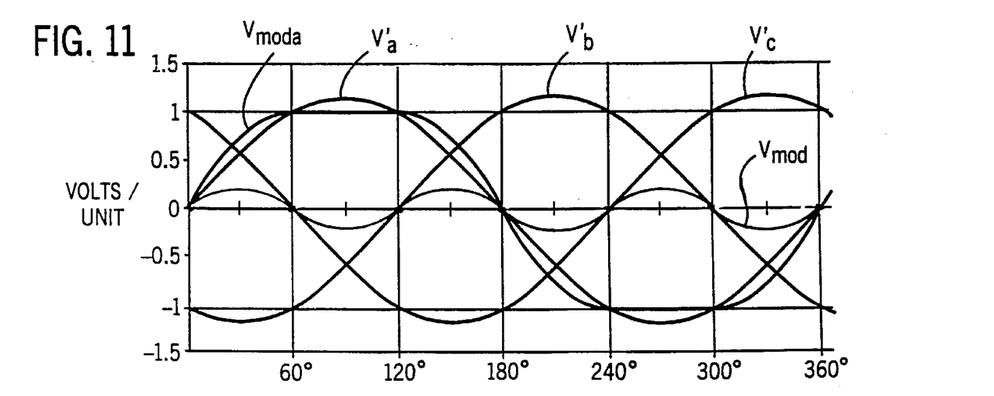
FIG. 11 is a graph illustrating three reference signals, a modifier signal, and a modified reference signal wherein the modulation index is equal to 1.1547.

The present invention is particularly useful where the modulation index $m_a$ is between 1 and 1.1547. Referring to FIG. 11, three initial reference signals $V_a'$, $V_b'$, $V_c'$, a modifier signal $V_{mod}$, and a single modified reference signal $V_{moda}$ are illustrated where the modulation index $m_a$ is 1.1547.

In this case, the inventive method produces a modified reference signal $V_{moda}$ having a maximum value equal to the peak value $V_{TP}$ of the triangle signal $V_T$. While not shown, the other two modified reference signals are shaped similarly to $V_{moda}$ and phase spaced therefrom 120°. Again, while these modified reference signals produce line to neutral voltages that are not sinusoidal, the resulting line-to-line voltage is sinusoidal. Where $m_A = 1.1547$, the maximum line-to-line voltage is the entire DC source potential $V_{dc}$. This is an increase of 15.47%.

Thus, a simple method of increasing PWM inverter voltage output, increasing the range of PWM linear operation, reducing switching losses, and maintaining identical PWM switch conducting times has been disclosed wherein frequency and angle information is not needed.

While the above description details various blocks, steps, and functions, it should be remembered that all of these elements are meant to be implemented in software as computer programs and represent algorithms for execution by conventional type digital processor adapted for industrial applications.

Although the present invention has been described above in the context of an apparatus, it should be understood that the present invention also contemplates a method to be used with a motor controller for increasing the output voltage of a PWM inverter, increasing the range of linearity of PWM inverter, minimizing switching losses, and equalizing conduction losses between inverter/converter switches. The method comprises the steps of providing a plurality of sinusoidal reference signals, the reference signals displaced one from another by a phase angle, one signal associated with each of three legs of the inverter, detecting a maximum value of the reference signals for providing a maximum signal, detecting a minimum value of the reference signals for providing a minimum signal, determining the absolute value of the maximum and minimum signals to produce absolute maximum and absolute minimum signals, if the absolute maximum signals is greater than or equal to the absolute minimum signal, mathematically combining the maximum signal with the constant magnitude signal to produce a modifier signal. However, if the absolute maximum signal is less than the absolute minimum signal, the method mathematically combines the minimum signal with the constant magnitude signal to produce the modifier signal. After the modifier signal is produced, the method add the modifier signal to the sinusoidal reference signals for providing a plurality of modified signals to the inverter, one modified reference signal associated with each leg.

In a preferred method, the step mathematically combining the maximum signal with the constant magnitude signal includes the step of subtracting the maximum from the constant magnitude signal. In addition, the step of mathematically combining the minimum signal with the constant magnitude signal preferably includes the steps of inverting the constant magnitude signal for producing an inverted signal and adding the inverted signal to the inverted minimum signal.

While this description has been by way of example of how the present invention can be carried out, those with experience in the art will recognize that various details may be modified to design other detailed embodiments, and that many of these embodiments will come within the scope of the invention. For example, while the present invention has been described as being used with a PWM inverter for use in converting constant voltage to alternating voltage, as known in the art, it can clearly be used to convert alternating voltage to constant voltage.

In addition, while one method for generating the modified reference signals of the present invention has been detailed, many other methods could be used to generate the modified signals. For example, a modifier signal could be generated that is equal to the maximum value of the absolute values of the reference signals. That modifier signal could be mathematically combined with the constant magnitude signals (i.e. peak triangle signal value) to produce the modified signal by subtracting the modifier signal therefrom and inverting the resulting signal during periods where the modifier signal corresponding to an instantaneously negative reference signal. The important aspect of the invention is that the amplitudes of the signals, not the angles and phases thereof are used to generate optimal reference signals that drive inverter/converter switches in a balanced manner.

Therefore, to apprise the public of the scope of the invention and the embodiments covered by the invention the following claims are made:

We claim:

1. A method of voltage conversion using a pulse width modulator and an inverter, the inverter including three legs, the inverter providing a triangle carrier signal having a peak magnitude, the method comprising the steps of:

providing a plurality of reference signals, the reference signals displaced one from another by a phase angle, one signal associated with each leg;

detecting a maximum value of the reference signals for providing a maximum signal;

detecting a minimum value of the reference signals for providing a minimum signal;

determining the absolute value of the maximum and minimum signals to produce absolute maximum and absolute minimum signals;

if the absolute maximum signal is greater than or equal to the absolute minimum signal, mathematically combining the maximum signal with the peak magnitude of the triangle carrier signal to produce a modifier signal;

if the absolute maximum signal is less than the absolute minimum signal, mathematically combining the minimum signal with the peak magnitude of the triangle carrier signal to produce the modifier signal; and adding the modifier signal to the reference signals for providing a plurality of modified reference signals to the inverter, one modified reference signal associated with each leg.

2. The method as recited in claim 1 wherein said method is used for conversion of constant voltage to alternating voltage.

3. The method as recited in claim 1 wherein the step of mathematically combining the maximum signal with the peak magnitude of the triangle carrier signal includes the step of subtracting the maximum signal from the peak magnitude of the triangle carrier signal.

4. The method as recited in claim 1 wherein the method further includes the step of inverting the minimum signal to produce an inverted minimum signal and the step of mathematically combining the minimum signal with the peak magnitude of the triangle carrier signal includes the steps of inverting the peak magnitude of the triangle carrier signal for producing an inverted signal and adding the inverted signal to the inverted minimum signal.

5. The method as recited in claim 1 wherein said method is used for conversion of alternating voltage to constant voltage.

6. A voltage conversion apparatus for use with a pulse width modulator, an inverter, and a signal generator, the inverter including three legs and providing a triangle carrier signal having a peak magnitude, the signal generator providing three sinusoidal reference signals, the reference signals displaced one from another by a phase angle, one signal associated with each leg, the apparatus comprising:

a first detector for detecting a maximum value of the reference signals for providing a maximum signal;

a second detector for detecting a minimum value of the reference signals for providing a minimum signal;

a first calculator for determining the absolute value of the maximum and minimum signals to produce absolute maximum and absolute minimum signals;

a second calculator for, if the absolute maximum signal is greater than or equal to the absolute minimum signal, mathematically combining the maximum signal with the peak magnitude to produce a modifier signal and, if the absolute maximum signal is less than the absolute minimum signal, mathematically combining the minimum signal with the peak magnitude to produce the modifier signal; and a summer for adding the modifier signal to the sinusoidal reference signals for providing a plurality of modified reference signals to the inverter, one modified reference signal associated with each leg.

7. The apparatus as recited in claim 6 wherein said inverter is used for conversion of constant voltage to alternating voltage.

8. The apparatus as recited in claim 6 wherein the second calculator includes a subtractor, the subtractor mathematically combining the maximum signal with the peak magnitude of the triangle carrier signal by subtracting the maximum signal from the peak magnitude.

9. The apparatus as recited in claim 6 wherein the second calculator also includes first and second inverters and an adder, the first inverter inverting the peak magnitude to produce an inverted signal, the second inverter inverting the minimum signal to produce an inverted minimum signal, and the adder adding the inverted signal to the minimum signal to mathematically combine the minimum signal with the peak magnitude producing the modifier signal.

10. The apparatus as recited in claim 6 wherein said inverter is used for conversion of alternating voltage to constant voltage.

11. A method of voltage conversion using a pulse width modulator and an inverter, the inverter including three legs, the inverter providing a triangle carrier signal having a peak magnitude, a method comprising the steps of:

providing a plurality of sinusoidal reference signals, the reference signals displaced one from another by a phrase angle, one signal associated with each leg;

determining a maximum value of the absolute values of the reference signals to produce a maximum value signal;

mathematically combining the maximum value signal and the peak magnitude to produce a modifier signal; and adding the modifier signal to each reference signal for providing a plurality of modified reference signals to the inverter, one modified reference signal associated with each leg.

12. The method as recited in claim 11 wherein the step of mathematically combining includes the steps of:

if the maximum value signal corresponds to a negative reference signal, inverting the peak magnitude to produce an inverted signal and adding the maximum value signal to the inverted signal to produce the modifier signal; and if the maximum value signal corresponds to a positive reference signal, subtracting the maximum value signal from the peak magnitude of the carrier signal to produce the modifier signal.

13. The method as recited in claim 11 wherein said method is used for conversion of constant voltage to alternating voltage.

14. The method as recited in claim 11 wherein said method is used for conversion of alternating voltage to constant voltage.

* * * * *